United States Patent
Yang et al.

(10) Patent No.: US 8,980,995 B2
(45) Date of Patent: Mar. 17, 2015

(54) PAINTS WITH IMPROVED WATER STAINING AND COLOR RUB-OFF QUALITIES

(75) Inventors: Yong Yang, Hillsborough, NJ (US); Vincent R. Libero, Newton, NJ (US); Luz Clarena Shavel, Budd Lake, NJ (US); Glenn M. Cooper, East Hanover, NJ (US); Johanna L. Garcia de Visicaro, Lake Hopatcong, NJ (US); George M. Amrich, Hackettstown, NJ (US); Robert J. Sheerin, North Caldwell, NJ (US); Steve Minassian, Millington, NJ (US)

(73) Assignee: Columbia Insurance Company, Omaha, NE (US)

( * ) Notice: Subject to any disclaimer, the term of this patent is extended or adjusted under 35 U.S.C. 154(b) by 0 days.

(21) Appl. No.: 13/640,109

(22) PCT Filed: Apr. 19, 2011

(86) PCT No.: PCT/US2011/032949
§ 371 (c)(1),
(2), (4) Date: Dec. 11, 2012

(87) PCT Pub. No.: WO2011/133487
PCT Pub. Date: Oct. 27, 2011

(65) Prior Publication Data
US 2013/0079456 A1  Mar. 28, 2013

Related U.S. Application Data

(60) Provisional application No. 61/325,566, filed on Apr. 19, 2010.

(51) Int. Cl.
*C09D 133/06* (2006.01)
*C08G 77/04* (2006.01)
*C08F 220/14* (2006.01)
*C08F 220/18* (2006.01)
*C09D 5/16* (2006.01)
*C08F 220/06* (2006.01)
*C08F 220/58* (2006.01)
*C08G 77/458* (2006.01)

(52) U.S. Cl.
CPC .......... *C09D 133/062* (2013.01); *C08F 220/14* (2013.01); *C08F 220/18* (2013.01); *C09D 5/1668* (2013.01); *C08F 220/06* (2013.01); *C08F 220/58* (2013.01); *C08G 77/04* (2013.01); *C08G 77/458* (2013.01)
USPC .......... 524/506; 524/547; 106/287.1

(58) Field of Classification Search
None
See application file for complete search history.

(56) References Cited

U.S. PATENT DOCUMENTS

| | | | | |
|---|---|---|---|---|
| 4,985,064 | A * | 1/1991 | Redlich et al. | 504/352 |
| 5,434,215 | A * | 7/1995 | Sankaran et al. | 524/763 |
| 5,569,715 | A | 10/1996 | Grandhee | |
| 6,225,372 | B1 | 5/2001 | Lykke | |
| 7,932,191 | B2 * | 4/2011 | Dungworth et al. | 442/59 |

(Continued)

*Primary Examiner* — Robert S Loewe
(74) *Attorney, Agent, or Firm* — Maryellen Feehery Hank; Reed Smith LLP

(57) ABSTRACT

The present invention comprises a hybrid latex polymer composition with one or more hydrophobic compound which is a solid or has a 50% distillation temperature of at least 200° C. and one or more matrix polymer, wherein the hydrophobic compound is entrapped in the structure of the matrix polymer. Further, the invention is a method of improving resistance to water staining and color rub-off in latex paints by including a hybrid latex polymer.

17 Claims, 2 Drawing Sheets

Monomers/Initiator

(56) References Cited

U.S. PATENT DOCUMENTS

| | | |
|---|---|---|
| 2003/0018102 A1 | 1/2003 | Weston |
| 2004/0087709 A1* | 5/2004 | Crater et al. ............. 524/507 |
| 2005/0145134 A1* | 7/2005 | Petrin et al. ............. 106/14.05 |
| 2008/0058473 A1 | 3/2008 | Freidzon |
| 2010/0016479 A1* | 1/2010 | Li ............................. 524/35 |
| 2010/0086692 A1* | 4/2010 | Ohta ........................ 427/256 |
| 2012/0027708 A1* | 2/2012 | Durand et al. ............ 424/64 |

* cited by examiner

PAINTS WITH IMPROVED WATER STAINING AND COLOR RUB-OFF QUALITIES

RELATED APPLICATIONS

This application is the United States National Stage of International Application No. PCT/US2011/032949, filed Apr. 19, 2011, which was published as International Publication No. WO 2011/133487, and which claims benefit of U.S. Provisional Patent Application No. 61/325,566 filed Apr. 19, 2010. Both applications are incorporated by reference in their entirety herewith.

BACKGROUND OF THE INVENTION

Health and environmental concerns have prompted a shift towards the use of latex paints instead of oil-based paints. Latex paints are challenging to formulate for many reasons, such as compatibility issues, drying problems, syneresis issues, and inferior physical properties. Latex paints tend to have softer films when they are dried since they do not react or crosslink like older oil based (alkyd) paints. In particular, latex paints have difficulty in maintaining consistent color when a painted surface is cleaned or wiped to remove a smudge or stain on the wall. Often some color is removed with the wiping material and a noticeable color change is effected (referred to as the "color rub-off").

Another problem with latex paints is a need to prevent water stains from showing on a painted surface (referred to as the "water staining" issue). Water stains occur when a painted surface is either washed to remove a stain or water is applied, condensed or spilled on a painted surface (such as near a shower) and the water leaves a visible mark on the painted surface after it evaporates, usually due to some surfactant being dissolved in the water and left as a residue when the water evaporates.

In the prior art, if more colorants are used to obtain deeper colors or improved hiding, more surfactants are also added to the paint through the colorants. Colorants typically include large amounts of surfactants to improve pigment wetting and compatibility with the wide variety of tint bases in which they are used. However, the increased surfactants make the paints water sensitive, causing increased water staining and color rub-off.

Color rub-off resistance may be improved with hydrophobic binders (e.g. high styrene content polymers), but these polymers have poor washability for oily materials ("oil stain release"), making them undesirable in a kitchen setting, for example. Sometimes acid monomers (e.g. acrylic acid and methacrylic acid) are used to improve this quality, but they cause reduced resistance to water staining and color rub-off.

Color rub-off resistance may also be improved with hydrophobic solid polymer additives, such as silicone modified urethane or alkyd dispersions. However, there is an incompatibility with acrylic, vinyl acrylic and styrenated polymers, which weaken the film integrity and resistance to washing (as measured by "scrubs") of the paints. Further, the water staining is still an issue.

SUMMARY OF THE INVENTION

The present invention improves a latex paint's resistance to water staining and color rub-off, while maintaining excellent scrubability and oil stain release properties. Unlike the prior art's hydrophobic solid polymer additives, which are loosely bound on the surface of the dry film or at the interface of the latex particles, the hybrid latex polymer of the present invention entraps hydrophobic compounds in the matrix polymer. Without being bound by mechanism, the hybrid latex polymers may have a core-shell structure or any heterogeneous morphology.

The hybrid latex polymer comprises one or more hydrophobic compounds and one or more matrix polymers, wherein the hydrophobic compounds are entrapped in the structure of the matrix polymers (not just on the surface of the matrix polymers).

DETAILED DESCRIPTION OF THE INVENTION

Figure 1:
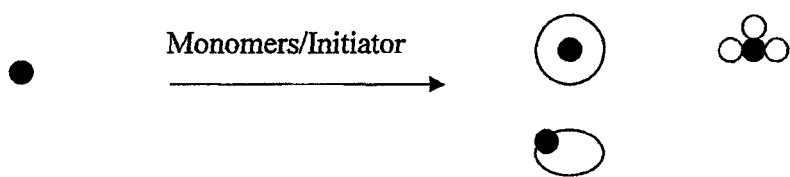
FIG. 1 shows the ideal formation of the hybrid latex polymers. When hybrid latex polymers are made with seeds of hydrophobic compound dispersions, the resulting hybrid latex particles may have an ideal core-shell structure (as seen in FIG. 1), which is preferred, or any heterogeneous morphology.
Figure 2:
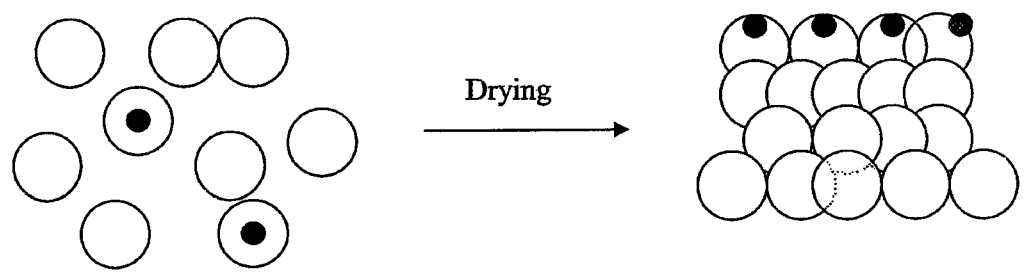
FIG. 2 shows how coatings form when the invention dries in another embodiment. In this embodiment, there is a mixture of hybrid latex polymers and conventional homogeneous latex particles, which is obtained from blending the hybrid latex polymers and conventional homogeneous latex particles or by adding seeds of hydrophobic compounds to a late stage of the monomer feed. When a coating is formed from this mixture, the surface has at least a substantial portion of the hydrophobic seeds of the hybrid latex polymers on the dry film surface.

U.S. Pat. No. 4,985,064 reflects the prior art polymerization technology. Liquid hydrocarbons (with the trade name Isoparaffin) are encapsulated, and other organic materials (e.g. herbicides) may be encapsulated with an isoparaffin solvent. At least one solvent is required for polymerization. Unlike the present invention, this product is used as an additive to improve the hiding of the coating, whereas the present invention is a binder or co-binder for paints (to reduce color transfer and water staining). The present invention is also different because the hybrid latex polymers are film forming and form a continuous film when dried, which repels water.

The present invention is a hybrid latex polymer, as described above in the Summary of the Invention. Without being limited to mechanism, the shell or second phase of the hybrid latex polymer may have the same or similar monomer composition as the homogeneous latex polymer to improve compatibility and/or have a self crosslinking mechanism to create a uniform crosslinking network to improve mechanical strength. The hybrid latex polymer comprises one or more hydrophobic compounds and one or more matrix polymer, wherein the hydrophobic compound is entrapped in the structure of the matrix polymer, not simply added or blended into the formulation or into a paint composition.

In this invention, "hydrophobic compound" is defined to mean a hydrophobic compound, which is a solid or has a 50% distillation temperature of at least over 200° C., and is preferably a (1) silicone or silicone modified polymer dispersion, (2) fluorinated polymer dispersions having a molecular weight of from a few hundred to over a million, (3) dispersion of hydrocarbon polymers with molecular weight from a few hundred to over a million, (4) polymers containing long alkane structure units on backbone or side chains or (5) mixtures thereof.

In this invention, the preferred hydrophobic compounds are solids in a dispersion, most preferably an aqueous dispersion. More preferably, the hydrophobic compounds comprise, without limitation, silicones, paraffins and mixtures thereof. More preferably, the hydrophobic compounds comprise, without limitation, silicone oil, reactive silicone oil, silicone modified urethanes, silicone modified alkyds, low molecular weight polyethylene, low molecular weight polypropylene, and mixtures thereof.

In this invention, "low molecular weight" is defined as from about 200 to about 1000.

In this invention, "paraffin" is defined as a low molecular weight polyethylene.

In this invention, "monomer mix" refers to the combination of monomers used to create the matrix polymer.

The "matrix polymer" is known to one of ordinary skill in the art and is formed from ethylenically unsaturated monomers such as (meth)acrylates, styrenated monomers, vinyl esters, and other ethylenically unsaturated monomers.

Examples of (meth)acrylates include various ($C_1$-$C_{20}$) alkyl or ($C_3$-$C_{20}$) alkenyl esters of (meth)acrylic acid; for example without limitation, methyl (meth)acrylate, ethyl (meth)acrylate, n-propyl (meth)acrylate, isopropyl (meth)acrylate, n-butyl (meth)acrylate, isobutyl (meth)acrylate, pentyl (meth)acrylate, 2-ethylhexyl (meth)acrylate, decyl (meth)acrylate, dodecyl (meth)acrylate, stearyl (meth)acrylate, α-chloroethyl (meth)acrylate, cyclohexyl (meth)acrylate, phenyl (meth)acrylate, methoxyethyl (meth)acrylate, ethoxyethyl (meth)acrylate, methoxypropyl (meth)acrylate, ethoxypropyl (meth)acrylate lauryl acrylate, methyl methacrylate, butyl methacrylate, ethyl methacrylate, isodecyl methacrylate, and lauryl methacrylate. The expression (meth)acrylic acid is intended to serve as a generic expression embracing both acrylic and methacrylic acid. Similarly, the expression (meth)acrylate is intended as a generic expression embracing both acrylic acid and methacrylic acid esters.

Examples of styrenated monomers include without limitation, styrene, alkylstyrenes (e.g., α-ethylstyrene, α-methylstyrene, vinyl toluene, 2,4-dimethylstyrene, 4-t-butylstyrene, and the like), and halostyrenes (e.g., α-bromostyrene, 2,6-dichlorostyrene, and the like).

Examples of vinyl esters include without limitation, vinyl carboxylate alkyl ethers (e.g., vinyl acetate, vinyl propionate, vinyl butyrates, vinyl benzoates, halo-substituted versions thereof such as vinyl chloroacetate, and the like), and veova monomers.

Other ethylenically unsaturated monomers that can be used as co-monomers include carboxylic group-containing of monomers, hydroxyl group-containing monomers, amide group-containing monomers, amino group-containing monomers, epoxy group-containing monomers, vinyl group-containing monomers and related oligomers. Examples are acrylic acid (AA), methacrylic acid (MAA), itaconic acid (IA), itaconic acid half ester, maleic acid, maleic acid half ester, maleic anhydride and the like, hydroxyethyl acrylate (HEA), hydroxyethyl methacrylate (HEMA), hydroxypropyl (meth)acrylate, hydroxybutyl acrylate, mono(meth)acrylic acid ester of allyl alcohol polyhydric alcohol and the like, 2-aminoethyl (meth)acrylate, dimethylaminoethyl (meth)acrylate, diethylaminoethyl (meth)acrylate, 3-aminopropyl (meth)acrylate, 2-butylaminoethyl (meth)acrylate, vinylpyridine and the like, acrylamide, maleinamide dialkyl acrylamides, dialkyl alkacrylamides, allyl compounds (e.g., allyl chloride, allyl esters of saturated, monocarboxylic acids, allyl alkyl esters of saturated, dicarboxylic organic acids, and the like), and the like, and combinations thereof.

Another group of monomers, which may be used in the matrix polymer, also contain reactive functional groups, but those groups are capable of crosslinking the polymer after the coatings products using the polymers are applied. Such monomers are collectively termed "crosslinkable monomers", such as "keto" or carbonyl containing monomers. Examples are methyl vinyl ketone, ethyl vinyl ketone, butyl vinyl ketone (meth)acrolein, crotonaldehyde, diacetone (meth)acrylamide, diacetone (meth)acrylate and mixed esters of aliphatic diols with (meth)acrylic acid and acetoacetic acid, diacetonacrylamide, diacetonemethacrylamide containing acetoacetoxyethyl methacrylate (AAEM), maleic anhydride, itaconic anhydride, citraconic anhydride, and diacetone acrylamide (DAAM); glycidyl meth(acrylate), β.-methylglycidyl meth(acrylate), 3,4-epoxycyclohexylmethyl meth(acrylate), 3,4-epoxycyclohexylethyl meth(acrylate), 3,4-epoxycyclohexylpropyl meth(acrylate), allylglycidyl ether, allylglycidyl ethe; N-methylol acrylamide, and those "oxidatively crosslinking" monomers, which utilize atmospheric oxygen but need no crosslinking agent in their composition to form oxidative crosslinks, and the like.

Additional monomers which may be used in the matrix polymer include ethyleneureido-functional monomers; allyl acetoacetate; ethylene; propylene; butadiene; and other vinyl esters; vinyl monomers, such as vinyl chloride, vinyl toluene, and vinyl benzophenone; vinylidene chloride, maleic anhydride; 2-acrylamido-2-methylpropane sulfonic acid; vinyl sulfonic acid; styrene sulfonic acid; 1-allyloxy-2-hydroxypropane sulfonic acid; alkyl allyl sulfosuccinic acid; sulfoethyl (meth)acrylate; phosphoalkyl (meth)acrylates, such as phosphoethyl(meth)acrylate, phosphopropyl(meth)acrylate, and phosphobutyl(meth)acrylate; phosphoalkyl crotonate, phosphoalkyl maleate; phosphoalkyl fumarate; phosphodialkyl(meth)acrylate; phosphodialkyl crotonate; and allyl phosphate. allyl methacrylate, diallyl phthalate, 1,4-butyleneglycol dimethacrylate, 1,2-ethyleneglycol dimethacrylate, 1,6-hexanediol diacrylate, and divinyl benzene.

The polymerization process required to form the hybrid latex polymers of the invention is an emulsion polymerization (as is known in the art) of the monomers used to form the matrix polymers, with the novel addition of the emulsion polymerization taking place in the presence of the hydrophobic compounds.

In one embodiment of the invention, the hydrophobic compounds are seeds in an emulsion. The hybrid latex polymers of the invention are typically polymerized in a latex system comprising water, surfactant, the desired monomers for the matrix polymer, the hydrophobic compound, an initiator, an optional polymer molecular weight control agent, an optional pH adjuster, an optional chaser agent, an optional coalescence aid, an optional defoamer, and an optional preservative, each of which can be added at various times. In one embodiment, the polymerization process takes place in an environment wherein no solvent is present.

Examples of surfactants useful in the polymerization process according to the invention may include, but are not limited to, nonionic and/or anionic surfactants such as ammonium nonoxynol-4 sulfate, nonylphenol (10) ethoxylate, nonylphenol (~10 mol %) ethoxylate, nonylphenol (~40 mol %) ethoxylate, octylphenol (~40 mol %) ethoxylate, octylphenol (9-10) ethoxylate, sodium dodecyl sulfonate, sodium tetradecyl sulfonate, sodium hexadecyl sulfonate, polyether phosphate esters, alcohol ethoxylate phosphate esters, those compounds sold under the tradename Triton™ (e.g., QS series, CF series, X series, and the like), those compounds sold under the tradename Rhodapon™, those sold under the tradename Rhodapex™, those compounds sold under the tradename Rhodacal™, those compounds sold under the tradename Rhodafac™, and the like, and combinations thereof.

Examples of initiators and chaser solutions useful in the polymerization process according to the invention may include, but are not limited to, ammonium persulfate, sodium persulfate, redox systems such as sodium hydroxymethanesulfinate (sodium formaldehyde sulfoxylate; reducer) and t-butyl-hydroperoxide (oxidizer), and the like, and combinations thereof, typically in an aqueous solution. Either or both of these components can optionally contain an additional surfactant and/or a pH adjuster, if desired to stabilize the emulsion.

Examples of pH adjusters useful in the polymerization process according to the invention may include, but are not limited to, ammonium hydroxide, sodium hydroxide, sodium carbonate, sodium bicarbonate, potassium hydroxide, potassium carbonate, potassium bicarbonate, ammonia, and the like, and combinations thereof. In certain cases, compounds that qualify as pH adjusters can be added for purposes other than adjusting pH, e.g., emulsion stabilization, and yet are still characterized herein as pH adjusters.

Polymer molecular weight control agents are designed to control (usually to limit) the molecular weight of a propagating polymer. While polymer molecular weight control agents may include things like radiation, they are typically molecules added to the polymerization mixture. Examples of polymer molecular weight control agents include, but are not limited to, chain transfer agents (CTAs), e.g., alkyl mercaptoesters such as isooctyl mercaptopropionate, alkyl mercaptans, and the like, and combinations thereof. Chain transfer agents typically operate as polymer molecular weight control agent molecules, for example, by catalytically or consumptively terminating a propagating polymer chain in a way that also initiates a newly propagating polymer chain. In this way, the amount of chain transfer agent(s) can be tailored to reduce the target polymer molecular weight in a set polymerization system, or alternately, in combination with calculation of the amount of initiator, can be calculated to target a particular average polymer molecular weight (e.g., within a given range) of a polymerization system.

One embodiment of the invention is a polymerization method comprising charging a reactor with seeds, wherein the seeds comprise hydrophobic compounds, wherein the hydrophobic compounds are present in a dispersion, heating the reactor to a specified temperature, adding an initiator and monomer mix to the reactor, maintaining the reactor at a specified temperature until the polymerization is substantially complete (less than about 2 weight % of unreacted monomer is present), and adding a chaser to the reactor, wherein the steps of the method occur in order. After the chaser is added, less than about 0.5 weight % unreacted monomer is present.

Another emulsion polymerization method comprises charging a reactor with a portion of an initiator and a small portion of monomer mix (up to about 5% by weight), heating the reactor to 80° C. after 15 minutes, continuing feeding the monomer mix and initiator over a period of 2 to 4 hours. When a portion of monomer feed is completed, the method includes adding seeds to the reactor, wherein the seeds comprise hydrophobic compounds, and resuming the charging of the remaining portion of the initiator and monomer mix. The resulting product is a mixture of a homo latex polymer and a hybrid latex polymer with hydrophobic seeds. Without limitation, in one embodiment, this polymerization process occurs with no solvent present.

The hybrid latex polymers of the present invention are useful in latex paints. The paint comprises a hybrid latex polymer, one or more binders, one or more biocides, one or more deformers, one or more rheology modifiers, one or more extender pigments/colorants, one or more pigments, and one or more other additives.

Examples of biocides or preservatives useful in the polymerization and/or paint process according to the invention may include, but are not limited to, hydroxy-functional aza-dioxabicyclo compounds such as those commercially available from ISP under the tradename Nuosept™ 95, those compounds sold under the tradename SKANE™, isothiazolones such as those sold under the tradename Kathon™, Polyphase™ additives from Troy Corp. and the like, and combinations thereof.

The paint may also contain one or more coalescence aids. Coalescence aids assist the formation of a film during the drying process of the paint. Examples of low-VOC (volatile oxygen content) coalescing agents can include, but are not limited to, fatty acid alkylene glycol monoesters (e.g., those compounds sold under the tradename Archer RC™ from Archer Daniels Midland), aromatic alkoxylates (e.g., cresol propoxylates such as those compounds sold under the tradename PLURACOAT™, including PLURACOAT™ CA120, PLURACOAT™ CA110, and PLURACOAT™ CA100), those compounds sold under the tradename EDENOL™ from Cognis (e.g., EDENOL™ EFC 100), those compounds sold under the tradename OPTIFILM™ from Eastman Chemical (e.g., OPTIFILM™ Enhancer 400), and the like, and combinations thereof. While less preferred, the composition can contain traditional (VOC) coalescence aids, which can include, but are not limited to, 2-ethylhexyl ether of ethylene glycol (e.g., commercially available from Eastman Chemical as Eastman™ EEH solvent), alkyl esters of aromatic carboxylic acids (e.g., 2-ethylhexyl benzoate and/or those compounds sold under the tradename Velate™ 368 from Velsicol Chemical Corp.), methyl carbitol, propylene glycol, ethylene glycol, optionally-alkyl-substituted alkanediol organic carboxylic acid monoesters (e.g., 2,2,4-trimethyl-1,3-pentanediol monoisobutyrate and those compounds sold under the tradename Texanol™ from Eastman Chemical), phosphate salts such as potassium tetrapyrophosphate, plasticizers such as dibutyl phthalate, and the like, and combinations thereof.

Examples of defoamers useful in the polymerization and/or paint process according to the invention may include, but are not limited to, polysiloxane-polyether copolymers such as those sold by Tego under the tradename Foamex™, those sold under the tradename BYK™, those sold under the tradename Drewplus™, those sold under the tradename Surfynol™, and the like, and combinations thereof.

Examples of rheology modifiers useful in the paint process according to the invention may include, but are not limited to, those commercially available from Rohm & Haas (now Dow Chemical Company) under the tradename Acrysol™, such as RM-242, RM-8W, RM-825, RM-5000, RM-2020 NPR and RM-825, Natrasol™ and Aquaflow™ from Aqualon Division of Hercules Inc. and UCAR Polyphobe™ from Dow.

While typically multiple pigments/colorants are present in end-use latexes that are to be used in paint or architectural coating applications, sometimes only a white pigment, such as a zinc oxide and/or a titanium oxide, is added in the early stages of the formation of the paint composition (e.g., in the base composition). In such a case, any other desired pigments/colorants of various colors (including more white pigment) can optionally be added at the later stages of, or after, formation of the paint composition. Examples of pigments/colorants useful according to the invention may include, but are not limited to, carbon black, iron oxide black, iron oxide yellow, iron oxide red, iron oxide brown, organic red pigments, including quinacridone red and metallized and non-metallized azo reds (e.g., lithols, lithol rubine, toluidine red, naphthol red), phthalocyanine blue, phthalocyanine green, mono- or di-arylide yellow, benzimidazolone yellow, heterocyclic yellow, DAN orange, quinacridone magenta, quinacridone violet, and the like, and any combination thereof. These exemplary color pigments can be added as powders, but can more conveniently be added as aqueous dispersions to paint compositions according to the invention.

Additionally or alternately, extender pigments/colorants can be added. Examples of extender pigments/colorants useful in the paint compositions according to the invention may include, but are not limited to, silica, silicates, carbonates such as calcium carbonates, and the like, and combinations thereof.

The paints of the current invention may further include other well known additives, such as, emulsifiers, coalescing aids, thickeners or rheology modifiers, freeze-thaw additives, humectants, wetting agents, colorants, waxes, uv-protectants, and anti-oxidants provided that they do not adversely affect the architectural coating's performance or dry film properties.

In one embodiment, a paint composition contains the hybrid latex polymer of the invention. The hybrid polymer contains a crosslinkable monomer, such as a "keto", a carbonyl, or an anhydride group, the paint composition contains a crosslinker that will crosslink the "keto", carbonyl, anhydride groups on the hybrid polymer during and after the paint is dried. Examples of the crosslinkable monomers are methyl vinyl ketone, ethyl vinyl ketone, butyl vinyl ketone (meth) acrolein, crotonaldehyde, diacetone(meth)acrylamide, diacetone (meth)acrylate and mixed esters of aliphatic diols with (meth)acrylic acid and acetoacetic acid, diacetonacrylamide, diacetonemethacrylamide contaiacetoacetoxyethyl methacrylate (AAEM), and diacetone acrylamide (DAAM), maleic anhydride, itaconic anhydride, citraconic anhydride, and the like; examples of a crosslinking agent in the paint composition are hydrazine derivatives, $C_2$-$C_{18}$ saturated dicarboxylic acid dihydrazides such as oxalic acid dihydrazide, malonic acid dihydrazide, glutaric acid dihydrazide, succinic acid dihyrazide, adipic acid dihydrazide, sebacic acid dihydrazide and the like; monoolefinic unsaturated dicarboxylic acid dihydrazides such as maleic acid dihydrazide, fumaric acid dihydrazide, itaconic acid dihydrazide and the like; terephtalic acid dihydrazide or isophthalic acid dihydrazide; pyromellitic acid dihydrazide, trihydrazide or tetrahydrazide; nitrilotrihydrazide, citric acid trihydrazide, 1,2,4-benzene trihydrazide, ethylenediaminetetraacetic acid tetrahydrazide, 1,4,5,8-naphthoic acid tetrahydrazide; polyfunctional hydrazides, hydrazines, semicarbazides, and the like.

In another embodiment, a paint composition containing the hybrid latex polymer of the invention can be formulated according to the following method without limiting the order of the addition of each ingredient. First, a pigment dispersion composition, or grind, is formed by: combining water, an optional organic solvent, a dispersant, a pH adjuster, a surfactant, a defoamer, a pigment/colorant, and a biocide and/or a preservative; stirring and optionally grinding for a period of time to sufficiently mix the ingredients; and, while continuing to stir and/or grind, adding more water. To this pigment dispersion composition can be added a hybrid latex polymer of the invention, followed by a pH adjuster, if desired, and an optional performance additive composition, such as without limitation, a surfactant, and a defoamer. A coalescence aid may optionally be added. Then, one or more rheology modifiers may be added, optionally including water, and a pH adjuster, forming the paint composition. Additional pigment/colorants may also be added, if desired for shading.

Another embodiment of the invention comprises a method of improving resistance to water staining and color rub-off in latex paints. This method comprises producing the hybrid, latex particles, and adding homogeneous latex particles, binders, pigments, additives, or mixtures thereof and other components known to one of ordinary skill in the art.

Example 1

Preparation of Acrylic Emulsion Polymer Using Silicone Elastomer as Seeds for Polymerization The emulsion polymerization is carried out in a four-neck flask under nitrogen purge.

The reaction flask is equipped with a condenser, a thermometer, an agitator and a feeding pump. The flask is immersed in a temperature controlled water bath maintained at a constant temperature within about ±0.1° C. of the set point. Table 1 shows the ingredients used for the polymerization.

TABLE 1

| Component | Parts (by weight) |
|---|---|
| Initial Charge in Reactor | |
| Deionized water | 46.0 |
| Sodium alphaolefin sulfonate 40% (RHODACAL A-246) | 0.07 |
| Sodium bicarbonate | 0.05 |
| Initial Seed | |
| Silicone dispersion (Dow Corning ® 84[1]) | 3.2 |
| Monomer Mix | |
| Deionized water | 10.1 |
| Diacetone acrylamide | 0.7 |
| Sodium alphaolefin sulfonate 40% | 1.4 |
| Ethoxylated phosphate ester 25% (Rhodafac RS 610) | 1.4 |
| Methacrylic acid | 0.37 |
| Methylmethacrylate | 16.1 |
| Butyl acrylate | 13.8 |
| Initiator Solution 1 | |
| Ammonium persulfate | 0.09 |
| Deionized water | 0.92 |
| Initiator Solution 2 | |
| Ammonium persulfate | 0.09 |
| Deionized water | 1.8 |
| Chaser solutions | |
| 1) Oxidizing agent | |
| t-butylperoxide | 0.06 |
| Deionized water | 0.5 |
| 2) Reducing agent | |
| Bruggolite ® FF6M | 0.05 |
| Deionized water | 0.7 |
| Sodium hydroxide solution 50% | 0.23 |
| Deionized water | 0.46 |
| Adipic acid dihydrazide | 0.23 |
| Deionized water | 0.69 |
| Deionized water (rinse) | 0.8 |
| Total | 100 |

[1]Dow Corning ® 84 is micronized silicone elastomer dispersion with 40% solid content.

The reaction starts with charging deionized water, sodium alphaolefin sulfonate, and sodium bicarbonate to the reaction flask. The rector was heated to 75° C. under agitation and then the seeds of silicone dispersion were charged to the reactor. After mixing for 5 minutes, the initiator solution 1 was added to the reaction flask. Thereafter, the monomer mix, which was premixed in a separate flask, and initiator solution 2 were fed to the reaction flask over a period of 3.5 hours. A small amount of deionized water was used to rinse the monomer mix flask and feeding tubes after feeding was complete. The temperature of the reaction flask was maintained at 80-85° C. for one hour after which it was cooled to about 65° C. Chaser solutions made from oxidizing agent and reducing agent were fed to the reaction flask over 30 minutes. The reaction contents were then cooled to 35° C. and sodium hydroxide solution and adipic acid dehydrazide solution were added.

All percentages in this specification are weight percentages unless otherwise noted. The Tg values in this specification are from the Fox Equation unless otherwise noted. The final polymer emulsion has a solid content of 31.7%. The dried polymer has a Tg of 14.5° C.

Example 2

Preparation of Acrylic Emulsion Polymer Using Modified Paraffin Wax Emulsion as Seeds for Polymerization The process and reaction conditions for this example are the same as used in the Example 1. Table 2 shows the ingredients of the reaction.

TABLE 2

| Component | Parts (by weight) |
|---|---|
| Initial Charge in Reactor | |
| Deionized water | 35.2 |
| Sodium alphaolefin sulfonate 40% (RHODACAL A-246) | 0.07 |
| Sodium bicarbonate | 0.05 |
| Initial Seed | |
| Modified Paraffin Wax Emulsion (Aquacer ® 539, 32% By BYK Chemie) | 12.2 |
| Monomer Mix | |
| Deionized water | 7.5 |
| Diacetone acrylamide | 0.7 |
| Sodium alphaolefin sulfonate 40% | 1.1 |
| Ethoxylated phosphate ester 25% (Rhodafac RS 610) | 1.4 |
| Methacrylic acid | 0.43 |
| Methylmethacrylate | 16.8 |
| Butyl acrylate | 16.7 |
| Initiator Solution 1 | |
| Ammonium persulfate | 0.07 |
| Deionized water | 0.7 |
| Initiator Solution 2 | |
| Ammonium persulfate | 0.07 |
| Deionized water | 1.4 |
| Chaser solutions | |
| 1) Oxidizing agent | |
| t-butylperoxide | 0.05 |
| Deionized water | 0.4 |
| 2) Reducing agent | |
| Bruggolite ® FF6M | 0.05 |
| Deionized water | 0.5 |
| Sodium hydroxide solution 50% | 0.3 |
| Deionized water | 2.5 |
| Adipic acid dihydrazide | 0.36 |
| Deionized water | 1.0 |
| Deionized water (rinse) | 0.4 |
| Total | 100 |

The polymer emulsion has a solid content of 40% by weight and a Tg of 8.8° C.

Example 3

Preparation of Acrylic Emulsion Polymer Using Silicone Modified Alkyd Emulsion as Seeds for Polymerization The polymerization was done with the same conditions as in Example 1.

TABLE 3

| Component | Parts (by weight) |
|---|---|
| Initial Charge in Reactor | |
| Deionized water | 16.2 |
| Sodium alphaolefin sulfonate 40% (RHODACAL A-246) | 0.05 |
| Initial Seed | |
| Silicone Alkyd Emulsion 40% (WorleeSol SE 420W from Worlee-Chemie) | 45.9 |
| Monomer Mix | |
| Deionized water | 5.4 |
| Diacetone acrylamide | 0.5 |
| Sodium alphaolefin sulfonate 40% | 0.9 |
| Ethoxylated phosphate ester 25% (Rhodafac RS 610) | 1.1 |
| Methacrylic acid | 0.2 |
| Methylmethacrylate | 12.7 |
| Butyl acrylate | 12.5 |
| Initiator Solution 1 | |
| Ammonium persulfate | 0.05 |
| Deionized water | 0.5 |
| Initiator Solution 2 | |
| Ammonium persulfate | 0.05 |
| Deionized water | 1.1 |
| Chaser solutions | |
| 1) Oxidizing agent | |
| t-butylperoxide | 0.04 |
| Deionized water | 0.3 |
| 2) Reducing agent | |
| Bruggolite ® FF6M | 0.03 |
| Deionized water | 0.4 |
| Sodium hydroxide solution 50% | 0.3 |
| Deionized water | 0.3 |
| Adipic acid dihydrazide | 0.1 |
| Deionized water | 1.1 |
| Deionized water (rinse) | 0.3 |
| Total | 100 |

The polymer emulsion has a solid content of 45% with 50% of solids being silicone modified alkyd seeds. The Tg of the acrylic polymer is about 8.8° C.

Example 4

Comparative Example

Preparation of Styrene-Acrylic Emulsion

In Example 4, a conventional approach was used to prepare seeds for the emulsion polymerization. The reaction conditions were the same as in Example 1.

Table 4 lists the ingredients for the emulsion polymerization. ADEKA ER-30 is a polymerizable non-ionic surfactant from ADEKA USA Corp.

TABLE 4

| Component | Parts (by weight) |
|---|---|
| Initial Charge in Reactor | |
| Deionized water | 32.8 |
| ADEKA SR-10 | 0.02 |
| Sodium bicarbonate | 0.02 |
| Monomer Mix | |
| Deionized water | 10.5 |
| Diacetone acrylamide | 1.7 |
| ADEKA SR-10 | 0.6 |
| Ethylmethacrylate phosphate 30%(Sipomer PAM-4000) | 0.2 |
| ADEKA ER-30 | 0.6 |
| Methacrylic acid | 0.2 |
| Methylmethacrylate | 12.4 |
| Butyl acrylate | 21.4 |
| Styrene | 10.2 |
| Wet adhesion monomer 50%, (Rohm & Haas (now Dow Chemical Company), QM-1458) | 1.1 |
| Initiator Solution 1 | |
| Ammonium persulfate | 0.1 |
| Deionized water | 0.4 |
| Initiator Solution 2 | |
| Ammonium persulfate | 0.1 |
| Deionized water | 0.8 |
| Chaser solutions | |
| 1) Oxidizing agent | |
| t-butylperoxide | 0.06 |
| Deionized water | 0.4 |
| 2) Reducing agent | |
| Bruggolite ® FF6M | 0.04 |
| Deionized water | 0.6 |
| Sodium hydroxide solution 50% | 0.2 |
| Deionized water | 2.0 |
| Adipic acid dihydrazide | 0.6 |
| Deionized water | 1.3 |
| Deionized water (rinse) | 0.5 |
| Total | 100 |

To prepare seeds for the emulsion polymerization, the reactor which contains deionized water, ADEKA SR-10 (a polymerizable anionic surfactant from ADEKA USA Corp, Saddle River, N.J.), and sodium bicarbonate was heated to 75° C. About 3.5% by weight of the monomer mixture was charged to the reactor. Initiator solution 1 was charged to the reactor to start the polymerization. After 15 minutes, latex particles were formed and were used as seeds for the emulsion polymerization.

The remaining monomer mix and initiator solution 2 were fed to the reaction during a period of 3.5 hours and reaction proceeded in the same way as in Example 1. The emulsion polymer has a solid content of 49% and a Tg of 5.2° C.

Example 5

Preparation of Styrene-Acrylic Emulsion Polymer Using Paraffin/Polyethylene Wax Dispersion as Seeds The ingredients of Example 5 are listed in Table 5.

In Example 5, the polymerization was started with a conventional seeding process as in the Example 4. After seeding polymerization, the monomer and initiator feeds started. When 80% percent of monomer mix was charged to the reactor, the feeds were stopped. A wax dispersion was added to the reactor. The monomer and initiator feeds were resumed. The total time of feeding is 3.5 hours.

The hydrophobic wax dispersion was a blend of paraffin and polyethylene dispersion, Michem® Emulsion 62330. The hydrophobic wax dispersion created additional seeds for the emulsion polymerization. The final product contains a blend of conventional polymer particles and wax seeded polymer particles.

TABLE 5

| Component | Parts (by weight) |
|---|---|
| Initial Charge in Reactor | |
| Deionized water | 31.8 |
| Sodium dodecylbenzene sulfonate 23% | 0.04 |
| Monomer Mix. | |
| Deionized water | 10.0 |
| Diacetone acrylamide | 1.4 |
| Sodium dodecylbenzene sulfonate 23% | 1.6 |
| Ethylmethacrylate phosphate 30%(Sipomer PAM-4000) | 0.4 |
| Ethoxylated phosphate ester 25% (Rhodafac RS 610) | 0.8 |
| Methacrylic acid | 0.2 |
| Methylmethacrylate | 12.0 |
| Butyl acrylate | 21.4 |
| Styrene | 10.2 |
| Wet adhesion monomer 50%, (Rohm & Haas, now Dow Chemical Company, QM-1458) | 1.1 |
| Second seed | |
| Paraffin/polyethylene wax blend emulsion 30% (Michem ® Emulsion 62330 from Michelman Inc.) | 2.9 |
| Initiator Solution 1 | |
| Ammonium persulfate | 0.08 |
| Deionized water | 0.4 |
| Initiator Solution 2 | |
| Ammonium persulfate | 0.08 |
| Deionized water | 0.8 |
| Chaser solutions | |
| 1) Oxidizing agent | |
| t-butylperoxide | 0.06 |
| Deionized water | 0.4 |
| 2) Reducing agent | |
| Bruggolite ® FF6M | 0.04 |
| Deionized water | 0.6 |
| Sodium hydroxide solution 50% | 0.2 |
| Deionized water | 2.0 |
| Adipic acid dihydrazide | 0.5 |
| Deionized water | 1.2 |
| Deionized water (rinse) | 0.3 |
| Total | 100 |

The polymer has a solid content of 49% and a Tg of 5.2° C.

Example 6

Preparation of a Stage-Feed Acrylic Emulsion Polymer Using Paraffin/Polyethylene Wax Dispersion as Seeds Example 6 illustrates a 2-stage feed acrylic emulsion polymer with a wax dispersion in the 2nd stage. The polymerization was started with charging 4% of the monomer mix 1 and initiator solution 1 for seeding polymerization. After 15 minutes, monomer mix 1 and initiator solution feeds started. When 40% of monomer mix 1 was charged, the feeds were stopped. Michem® Emulsion 62330 was added to the reactor.

Monomer mix 2 was added to the remaining monomer mix 1, and then the monomer and initiator feeds were resumed. The total time of feeding is 3.5 hours.

TABLE 6

| Component | Parts (by weight) |
|---|---|
| Initial Charge in Reactor | |
| Deionized water | 29.8 |
| Sodium alphaolefin sulfonate 40% | 0.08 |
| Sodium bicarbonate | 0.04 |
| Monomer Mix. 1 | |
| Deionized water | 8.9 |
| Diacetone acrylamide | 1.6 |
| Sodium alphaolefin sulfonate 40% | 0.8 |
| Ethoxylated phosphate ester 25% (Rhodafac RS 610) | 1.6 |
| Methacrylic acid | 0.5 |
| Methylmethacrylate | 17.3 |
| Butyl acrylate | 21.5 |
| Wet adhesion monomer 50%, (ROHM & HAAS, now DOW CHEMICAL COMPANY, QM-1458) | 1.1 |
| Monomer Mix. 2 | |
| Deionized water | 1.6 |
| Diacetone acrylamide | 0.2 |
| Sodium alphaolefin sulfonate 40% | 0.1 |
| Methylmethacrylate | 5.4 |
| Wax seeds | |
| Michem ® Emulsion 62330 | 1.6 |
| Initiator Solution 1 | |
| Ammonium persulfate | 0.1 |
| Deionized water | 0.6 |
| Initiator Solution 2 | |
| Ammonium persulfate | 0.1 |
| Deionized water | 1.2 |
| Chaser solutions | |
| 1) Oxidizing agent | |
| t-butylperoxide | 0.06 |
| Deionized water | 0.4 |
| 2) Reducing agent | |
| Bruggolite ® FF6M | 0.04 |
| Deionized water | 0.6 |
| Sodium hydroxide solution 50% | 0.2 |
| Deionized water | 2.0 |
| Adipic acid dihydrazide | 0.6 |
| Deionized water | 1.2 |
| Deionized water (rinse) | 0.8 |
| Total | 100 |

The final product contains a blend of two types of polymer latex particles. The polymer has a solid content of 49%. The first type is core-shell polymer having a soft core with a Tg of −2.6° C. and a hard shell with a Tg of 18.5° C. The second one is a wax seeded polymer with a Tg of 18.5° C.

Example 7

Preparation of Flat Paints with Hydrophobic Wax Seeded Emulsion Polymers

Low sheen paints with 85 degree gloss less than 5 were prepared from the polymers in Examples 4, 5 and 6.

TABLE 7

Ingredients of Paints of Example 7

| Description | A | B | C |
|---|---|---|---|
| Grind Composition | | | |
| WATER (lbs) | 94.2 | 94.2 | 94.2 |
| PROPYLENE GLYCOL | 9.8 | 9.8 | 9.8 |
| NUOSEPT 95 | 2.0 | 2.0 | 2.0 |
| TAMOL 681 | 6.8 | 6.8 | 6.8 |
| DREWPLUS L 475 FOAM | 0.9 | 0.9 | 0.9 |
| TRONOX CR-826 | 50.0 | 50.0 | 50.0 |
| ATTAGEL 50 | 3.5 | 3.5 | 3.5 |
| OPTIWHITE MX | 60.0 | 60.0 | 60.0 |
| OMYACARB 6{Omya} | 53.0 | 53.0 | 53.0 |
| VICRON 31-6(Spec. Minerals) | 125.0 | 125.0 | 125.0 |
| SYLOID W 900 | 25.0 | 25.0 | 25.0 |
| POTASSIUM CARBONATE | 2.0 | 2.0 | 2.0 |
| Let-down | | | |
| TRITON X-100 | 4.5 | 4.5 | 4.5 |
| TRITON GR-5M (UC) | 1.1 | 1.1 | 1.1 |
| OPTIFILM ENHANCER 400 | 19.7 | 19.7 | 19.7 |
| Styrene acrylic polymer 45% | 26.3 | 26.3 | 26.3 |
| WATER | 10.0 | 10.0 | 10.0 |
| Polymer of Example 4 | 420.0 | 0.0 | 0.0 |
| Polymer of Example 5 | 0.0 | 420.0 | 0.0 |
| Polymer of Example 6 | 0.0 | 0.0 | 420.0 |
| ACRYSOL RM-5000 | 20.0 | 20.0 | 20.0 |
| ACRYSOL RM-825 (Rohm and Haas) | 2.5 | 2.5 | 2.5 |
| DREWPLUS L 475 FOAM | 4.5 | 4.5 | 4.5 |
| POLYPHASE 678 | 2.0 | 2.0 | 2.0 |
| WATER | 84.4 | 84.4 | 84.4 |
| Sheen @ 85 degree | <5 | <5 | <5 |

Example 8

Preparation of Eggshell Paint with Wax Seeded Polymer

Example 8 is an eggshell paint made from the polymer of Example 5. The 85 degree sheen for an eggshell paint is about 20.

TABLE 8

Ingredients of Paint of Example 8

| Description | A |
|---|---|
| Grind Composition | |
| WATER (lbs) | 112.4 |
| BYK 1650 (defoamer) | 1.5 |
| NUOSEPT 95 | 1 |
| TAMOL 681 | 10 |
| DREWPLUS L 475 FOAM | 0 |
| TRONOX CR-826 | 49 |
| OMYACARB 3 | 130 |
| OMYACARB 6 | 55 |
| Ammonium hydroxide (29%) | 0.8 |
| ATTAGEL 50 | 5 |
| Let-Down | |
| TRITON X-100 | 3.6 |
| TRITON GR-5M | 2.1 |
| Surfynol 104PG50 | 0.4 |
| Texanol | 3 |
| OPTIFILM ENHANCER 400 | 19.7 |
| Rhoplex HG-16 | 45 |
| Polymer of Example 5 | 498 |

TABLE 8-continued

Ingredients of Paint of Example 8

| Description | A |
|---|---|
| ACRYSOL RM-5000 | 23 |
| ACRYSOL RM-825 | 3 |
| BYK 1650 (defoamer) | 0.0 |
| POLYPHASE 678 | 2 |
| WATER | 24 |
| Sheen @ 85 degree | ~20 |

Example 9

Preparation of Semigloss Paints Using a Blend of Conventional Polymer and a Wax Seeded Polymer Example 9 described two semi-gloss paints using (1) a conventional acrylic copolymer and (2) a blend of conventional copolymer and wax seeded polymer.

TABLE 9

Ingredients of Paints of Example 9

| | A | B (comparative) |
|---|---|---|
| Grind | | |
| WATER (lbs) | 38 | 38 |
| NUOSEPT 498 PRESERVATIVE | 2 | 2 |
| ZINC OMADINE ZOE DISPERSION MILDEWCIDE | 2 | 2 |
| TAMOL 165A | 10 | 10 |
| CARBOWET DC01 SURFACTANT | 1 | 1 |
| FOAMSTAR A-45 | 0.5 | 0.5 |
| TRONOX CR-826 | 56 | 56 |
| ASP 170 | 35 | 35 |
| WATER | 55 | 55 |
| POTASSIUM CARBONATE | 0.5 | 0.5 |
| MIX FOR 5 MINUTES. | 0 | 0 |
| USE WATER FOR RINSING TANK AND FLUSHING LINE | 0 | 0 |
| WATER | 20 | 20 |
| Let-down | | |
| Acrylic polymer 49.5% | 535 | 490 |
| Polymer of Example 3 (wax seeded polymer) | 0 | 89 |
| OPTIFILM ENHANCER 400 | 10 | 10 |
| AQUAFLOW NHS-300 RHEOLOGY MODIFIER | 19 | 19 |
| ACRYSOL RM-8W | 4 | 5 |
| AQUACER 539 | 12 | 12 |
| FOAMSTAR A-45 | 1.5 | 1.5 |
| RHODASURF BC-720 | 4.5 | 4.5 |
| POLYPHASE 678 | 2 | 2 |
| WATER | 106 | 66 |
| BYK-420 | 1 | 1 |
| Gloss @ 60 degree | 64 | 64 |

Testing the Physical and Mechanical Properties of the Paints in Examples 7-9

All the tests were done on the paints of Examples 7-9 tinted with an oxide red colorant, Benjamin Moore 229R3. The amount of colorants tinted to each gallon of paint (112 fluid ounces) is 18 fluid ounces.

Color TransferTest

Color transfer test was performed on draw downs of paints tinted with the testing colorant. The draw downs were prepared using BYK-Gardner byko-charts with a 3-mil bird bar. The drawdown films were dried for 7 days at ambient conditions before testing.

A BYK-Gardner Abrasion Tester with a boat weighing 1000 grams is used to measure color transfer. A damp, white fabric sheet is attached to the lower surface of the boat which is placed on the drawdown films. The sample is scrubbed is for 10 cycles and then the white fabric sheet is removed from the boat and is let dry for one day.

The dried white fabric sheet is examined for the color transferred from the drawdown films. A rating from 1 to 5 is given with 5 being no color transfer and 1 being the worst amount of color transfer observed, respectively.

Water Staining Test

Water staining test was done on 3-mil bird bar draw downs of paint dried for one day at ambient conditions. A few drops of water were placed on the surface of paint on the draw down. The draw down was then placed vertically to let the water run down the surface of the paint. The draw down was then examined next day for water stains due to the surfactant leaching. A rating from 1 to 5 was given with 1 being worse and 5 being best.

Water Resistance Test

Water resistance test was done on a 3-mil bird bar draw downs paint film dried for one day at ambient conditions. A few drops of water were placed on the surface of paint of the draw downs. After 1 minute, the water was then removed with a paper tower, and the wetted paint surface was scratched with a finger nail to check the hardness. A rating of 1 to 5 was given with 1 being the softest, indicating the worst water resistance, and 5 being the hardest, indicating the best water resistance.

Stain Removal Test

Stain removal was performed according to ASTM D4828. The test shows relative ease of soil or stain removal from a paint film using cleaning solution common to households. The test was done on a 7-mil draw down of paint dried for 7 days. An oil stain was applied to the surface of the draw down and was dried for 1 day. The draw down was scrubbed for 250 cycles with a BYK-Gardner Abrasion Tester equipped with a sponge boat. The sponge was soaked with a household cleaning solution, Clorox Formula 409. A rating from 1 to 5 was given based on visual observation with 1 being the least removal and 5 being the complete removal of stains (in which the paint film returns to the original color).

Scrub Resistance Test

The scrub test was done using ASTM D2486 Method B. The test was done on a 7-mil draw down of paint dried for 7 days. A BYK-Gardner Abrasion Tester with a boat weighing 1000 grams was used for the test. The scrub cycle number at failure was recorded (where the paint film was removed and the surface of the underlying substrate shows through). The higher number from the reading, the better the scrub resistance of the paint is.

Table 10 shows the results of color transfer, water staining, water resistance, stain removal, and scrub resistance tests.

TABLE 10

| | Paints | | | | |
|---|---|---|---|---|---|
| | Example 7A (comparative) Flat | Example 7B Flat | Example 7C Flat | Example 9A (comparative) Semigloss | Example 9B Semigloss |
| Color transfer | 2 | 4.5 | 4 | 4 | 5 |
| Water staining | 2 | 3.5 | 4 | 4 | 4 |
| Water resistance | 4 | 4 | 4 | 4 | 4 |

TABLE 10-continued

| | Paints | | | | |
|---|---|---|---|---|---|
| | Example 7A (comparative) Flat | Example 7B Flat | Example 7C Flat | Example 9A (comparative) Semigloss | Example 9B Semigloss |
| Stain removal | — | 5 | — | 5 | 5 |
| Scrub resistance | 510 | 1232 | 1600 | — | — |

As seen in Table 10, comparing the flat paints, the present invention shows improvements in color transfer and water staining, while water resistance and stain removal are at least as good as the comparative example.

Comparing the semigloss paints, the present invention shows an improvement in color transfer, while water staining, water resistance and stain removal were the same as the comparative example.

It is to be understood that while the invention has been described in conjunction with the detailed description thereof, that the foregoing description is intended to illustrate and not limit the scope of the invention, which is defined by the scope of the appended claims. Other aspects, advantages, and modifications are evident from a review of the following claims.

What is claimed is:

1. A hybrid latex polymer composition comprising
   one or more hydrophobic compounds, wherein the hydrophobic compounds are a solid or have a 50% distillation temperature of at least about 200° C. and
   one or more matrix polymer, wherein the hydrophobic compound is entrapped in the structure of the matrix polymer and wherein the hydrophobic compounds are added only after at least 40% of the matrix polymer is polymerized, wherein the hydrophobic compound is selected from the group consisting of silicones, silicone modified alkyds, low molecular weight polyethylene, low molecular weight polypropylene and paraffins, and wherein the matrix polymer is formed from one or more monomers selected from the group consisting of (meth) acrylates, styrenated monomers, vinyl esters, and other ethylenically unsaturated monomers.

2. The composition of claim 1 further comprising one or more crosslinkable monomers.

3. The hybrid latex polymer composition of claim 2 wherein the composition is in a paint and wherein the paint further comprises one or more binders;
   one or more pigments/colorants; and
   one or more additives.

4. The hybrid latex polymer composition of claim 1 wherein the composition is in a paint and wherein the paint further comprises one or more binders;
   one or more pigments/colorants; and
   one or more additives.

5. The composition of claim 1 further comprising a latex polymer, wherein the latex polymer does not have entrapped hydrophobic compounds.

6. An emulsion polymerization method comprising
   Heating the reactor,
   Adding an initiator and monomer mix to the reactor,
   Charging a reactor with seeds, wherein the seeds comprise a hydrophobic compound, wherein the hydrophobic compound is a solid or has a 50% distillation temperature of at least about 200° C., wherein the charging occurs after at least 40% of a matrix polymer is polymerized,
   Maintaining the reactor at a specified temperature until less than about 2 weight % unreacted monomer is present and
   Adding a chaser to the reactor, wherein the steps of the method occur in order, wherein the hydrophobic compound is selected from the group consisting of silicones, silicone modified alkyds, low molecular weight polyethylene, low molecular weight polypropylene and paraffins, and wherein the matrix polymer is formed from one or more monomers selected from the group consisting of (meth)acrylates, styrenated monomers, vinyl esters, and other ethylenically unsaturated monomers.

7. The method of claim 6 wherein no solvent is present.

8. The method of claim 6 adding one or more crosslinkable monomers.

9. An emulsion polymerization method comprising
   Charging a reactor with a portion of an initiator and monomer mix,
   Heating the reactor,
   Adding seeds to the reactor, wherein the seeds comprise a hydrophobic compound, wherein the hydrophobic compound is a solid or has a 50% distillation temperature of at least about 200° C., wherein the adding step occurs after at least 40% of a matrix polymer is polymerized,
   Resuming the charging of the remaining portion of the initiator and monomer mix,
   Maintaining the reactor at a specified temperature until less than about 2 weight % unreacted monomer is present, and
   Adding a chaser to the reactor, wherein the steps of the method occur in order, wherein the hydrophobic compound is selected from the group consisting of silicones, silicone modified alkyds, low molecular weight polyethylene, low molecular weight polypropylene and paraffins, and wherein the matrix polymer is formed from one or more monomers selected from the group consisting of (meth)acrylates, styrenated monomers, vinyl esters, and other ethylenically unsaturated monomers.

10. The method of claim 9 wherein no solvent is present.

11. The method of claim 9 further comprising adding one or more crosslinkable monomers.

12. A paint comprising
   a hybrid latex polymer composition comprising one or more hydrophobic compound and one or more matrix polymer, wherein the hydrophobic compound is a solid or has a 50% distillation temperature of at least about 200° C. and wherein the hydrophobic compound is entrapped in the structure of the matrix polymer and wherein the hydrophobic compounds are added only after at least 40% of the matrix polymer is polymerized,
   one or more binders;
   one or more pigments/colorants; and
   one or more additives, wherein the hydrophobic compound is selected from the group consisting of silicones, silicone modified alkyds, low molecular weight polyethylene, low molecular weight polypropylene and paraffins, and wherein the matrix polymer is formed from one or more monomers selected from the group consisting of (meth)acrylates, styrenated monomers, vinyl esters, and other ethylenically unsaturated monomers.

13. The paint of claim 12 further comprising homogeneous latex particles.

14. The paint of claim 12 further comprising one or more additives selected from the group consisting of surfactants, pH adjusters, polymer molecular weight control agents, biocides, preservatives, anticorrosive agents, rheology modifiers, coalescence aids, and extender pigments/colorants.

15. The paint of claim 12 further comprising one or more crosslinkable monomers.

16. A method of improving resistance to water staining and color rub-off in latex paints comprising
   polymerizing a hybrid latex polymer comprising one or more hydrophobic compound and one or more matrix polymer, wherein the hydrophobic compound is entrapped in the structure of the matrix polymer, and wherein the hydrophobic compound is a solid or has a 50% distillation temperature of at least about 200° C. and wherein the hydrophobic compounds are added only after at least 40% of the matrix polymer is polymerized; and
   adding one or more selected from the group consisting of binder, pigment and additive, wherein the hydrophobic compound is selected from the group consisting of silicones, silicone modified alkyds, low molecular weight polyethylene, low molecular weight polypropylene and paraffins, and wherein the matrix polymer is formed from one or more monomers selected from the group consisting of (meth)acrylates, styrenated monomers, vinyl esters, and other ethylenically unsaturated monomers.

17. The method of claim 16 further comprising adding one or more crosslinkable monomers.

\* \* \* \* \*